United States Patent [19]

Wille

[11] Patent Number: 4,697,775
[45] Date of Patent: Oct. 6, 1987

[54] BOAT GUNWALE ATTACHMENT APPARATUS

[76] Inventor: Mark E. Wille, 133 Seager Dr., Oconomowoc, Wis. 53066

[21] Appl. No.: 901,957

[22] Filed: Aug. 29, 1986

[51] Int. Cl.⁴ .............................................. A47B 96/06
[52] U.S. Cl. ................................. 248/231.4; 248/214
[58] Field of Search ................. 248/231.4, 309.1, 310, 248/313, 316.1, 214; 211/88; 114/221, 364; 43/43.12, 21.2, 17.5; 362/396

[56] References Cited

U.S. PATENT DOCUMENTS

| | | | |
|---|---|---|---|
| 2,086,355 | 7/1937 | Eansor | 248/313 X |
| 2,446,282 | 8/1948 | Hart | 248/42 |
| 2,559,003 | 7/1951 | Brow | 362/396 |
| 2,655,337 | 10/1953 | Diesfeld | 362/396 X |
| 2,721,718 | 10/1955 | Wagner | 248/214 |
| 2,786,296 | 3/1957 | Loebensteen | 43/43.12 |
| 2,813,196 | 11/1957 | Dempsey | 362/396 |
| 2,828,096 | 3/1958 | Beri | 248/40 |
| 2,869,812 | 1/1959 | Hamel | 248/42 |
| 2,990,642 | 7/1961 | Bloom | 43/55 |
| 3,008,679 | 11/1961 | Powell | 248/231.4 |
| 3,015,467 | 1/1962 | Vieaux | 248/226 |
| 3,178,144 | 4/1965 | Kimoto | 248/309.1 X |
| 3,198,408 | 8/1965 | Benner | 248/288.3 X |
| 3,275,160 | 9/1966 | Zurker | 248/214 X |
| 3,290,816 | 12/1966 | Eklof | 43/21.2 |
| 3,601,919 | 8/1971 | Nixon | 43/21.2 |
| 3,783,548 | 1/1974 | Fisher | 43/21.2 |
| 3,843,082 | 10/1974 | Garrett | 248/226 |
| 3,847,286 | 11/1974 | Garrett | 248/309.1 X |
| 4,108,413 | 8/1978 | Goserud | 248/214 |
| 4,338,875 | 7/1982 | Lisowski | 114/221 |
| 4,453,492 | 6/1984 | Miller | 114/364 |

FOREIGN PATENT DOCUMENTS 2428121 6/1978 France ............................ 182/82

Primary Examiner—J. Franklin Foss
Attorney, Agent, or Firm—Robert T. Johnson

[57] ABSTRACT

In a fishing boat there is usually a shortage of space, and further in night fishing, a lantern is required. It is a purpose of this invention to disclose a boat gunwale attachment apparatus that is mounted over the gunwale and suitable for holding a lantern, for example, on the outboard side of a boat. This apparatus may fit in slots in a gunwale attachment or it may straddle the gunwale and boat sidewall, and held rigidly in place by a wing nut on assembly screw extending through outboard and inboard housing segments.

7 Claims, 11 Drawing Figures

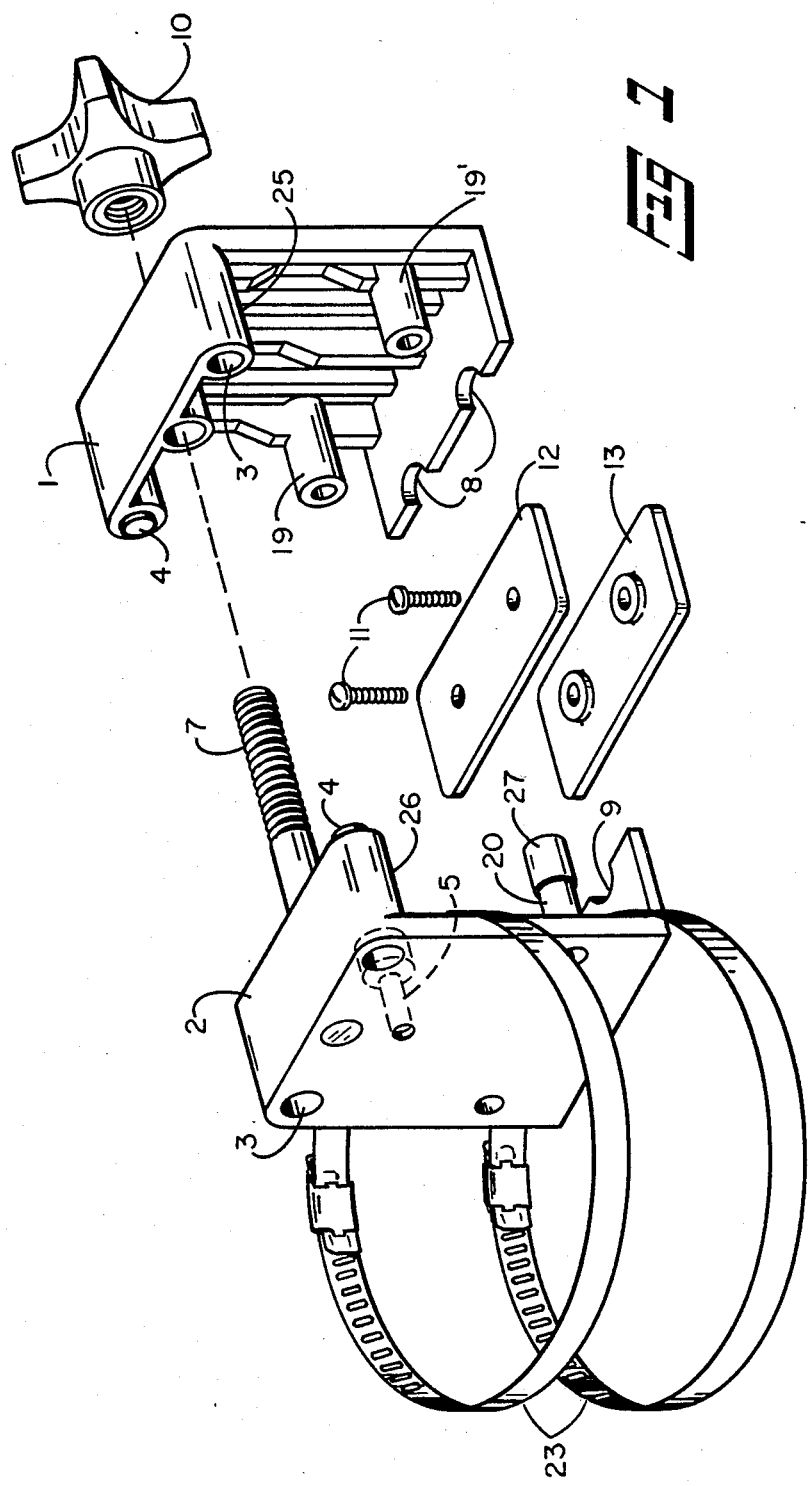

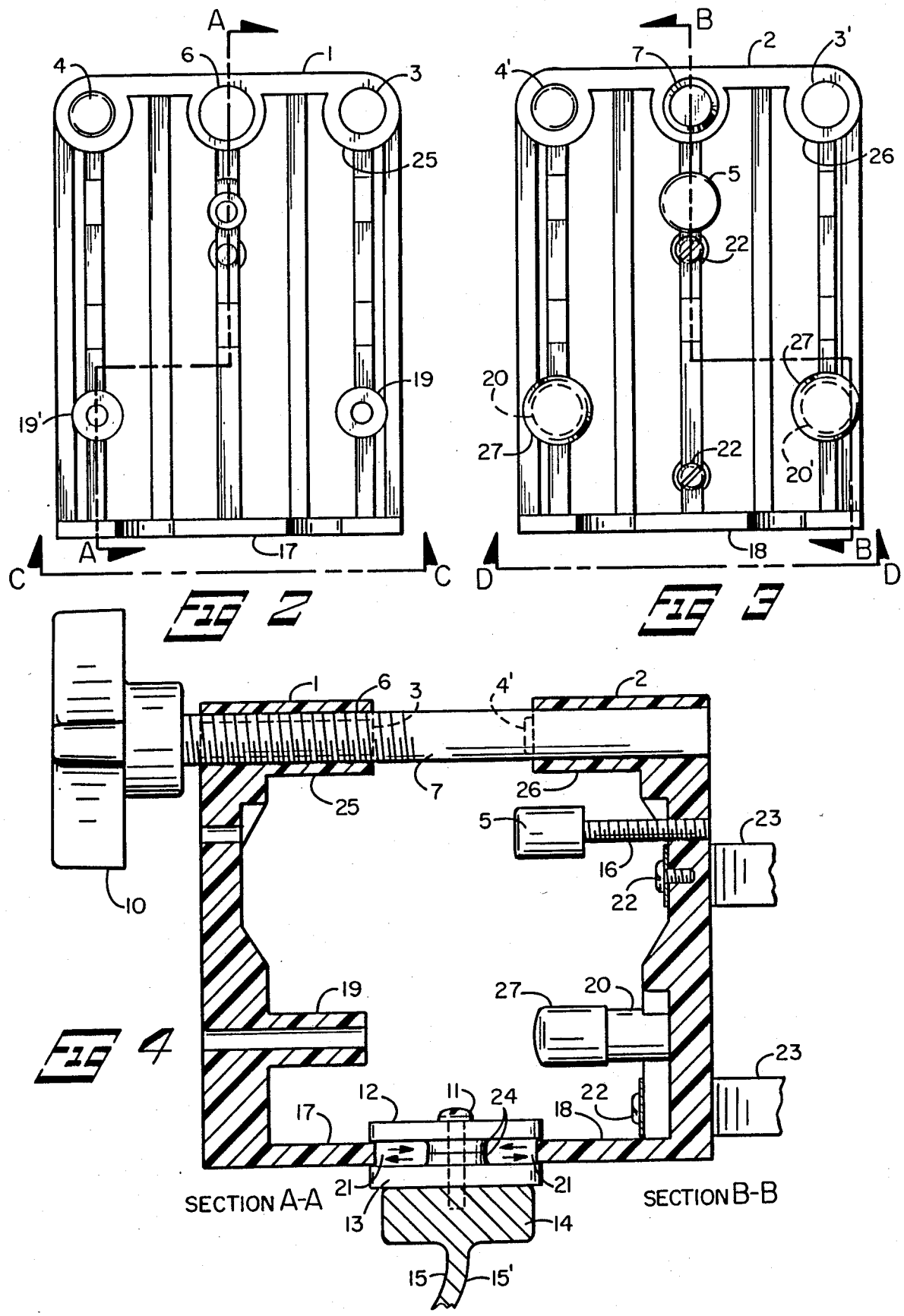

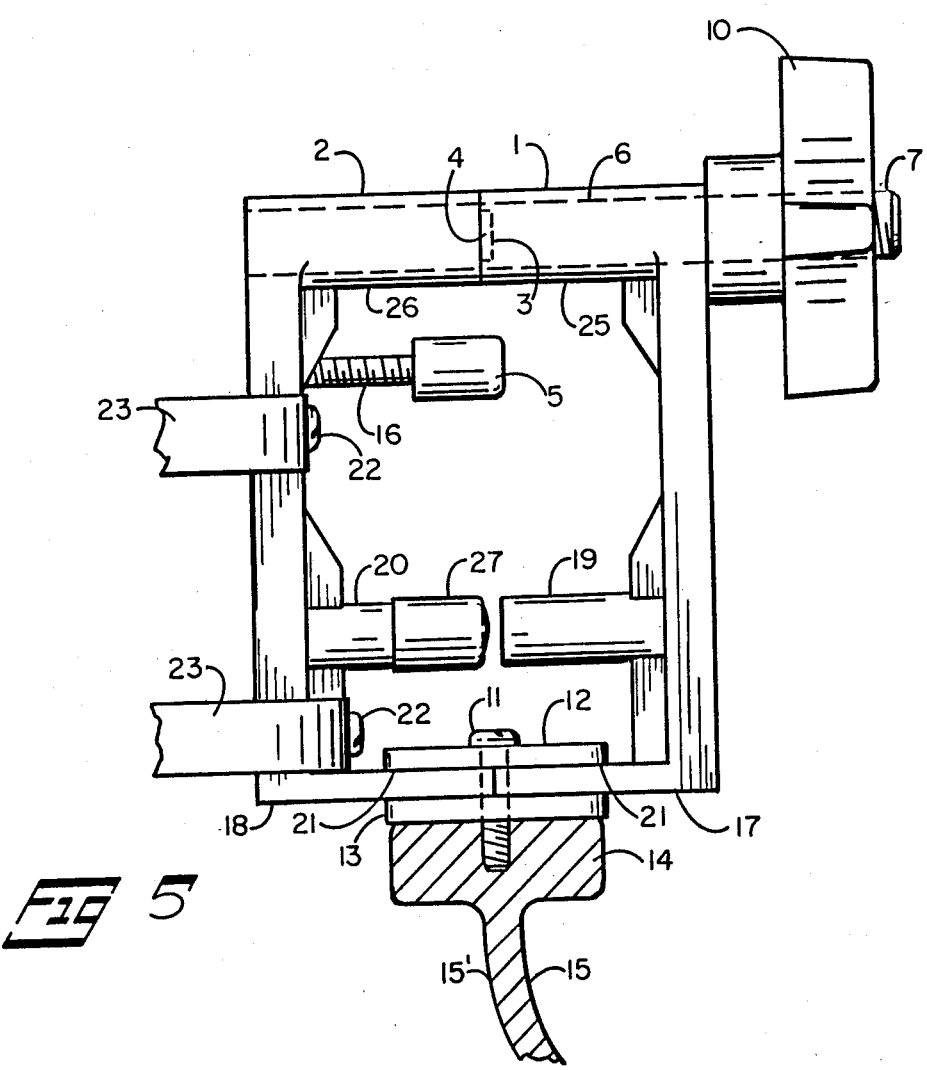
FIG 5
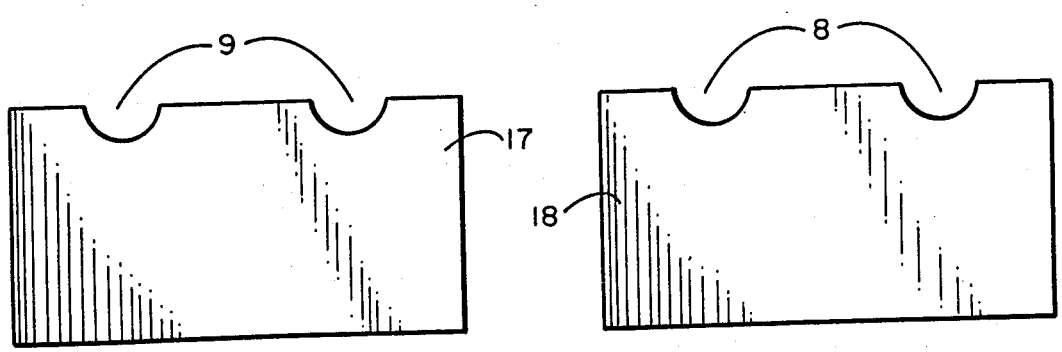
FIG 6
(VIEW C-C)
FIG 7
(VIEW D-D)

BOAT GUNWALE ATTACHMENT APPARATUS

EXPLANATION OF INVENTION

In the usual fishing boat there is a problem of space and a further problem of an outboard light when fishing at night.

One of the objects of this invention is to disclose boat gunwale attachment apparatus which serves as a base for mounting of fishing equipment such as a fishing pole, or lantern mounted outboard of the gunwale.

DESCRIPTION OF PRIOR ART

Reference is now made to the following patents.

U.S. Pat. No. 2,446,282 to Hart. This patent is for a Fishing Rod Holder and comprises an adjustable clamp apparatus fitting around the gunwale.

U.S. Pat. No. 2,786,296 to Loebensteen, which is for Trolling Tackle; apparatus straddles gunwale and tightened with screw clamp.

U.S. Pat. No. 2,828,096 to Beri. This comprises a U clamp over the gunwale.

U.S. Pat. No. 2,869,812 to Hamel. This patent discloses a plastic shaped component to fit over and around the gunwale.

Other patents of reference are:
U.S. Pat. No. 2,990,642
U.S. Pat. No. 3,015,467
U.S. Pat. No. 3,290,816
U.S. Pat. No. 3,601,919
U.S. Pat. No. 3,783,548
U.S. Pat. No. 3,843,082
U.S. Pat. No. 4,338,875
U.S. Pat. No. 4,453,490

SUMMARY OF THE INVENTION

This invention comprises a boat gunwale attachment apparatus, comprised of two segments which are mountable as a unit on the top surface of the gunwale by fitting of opposing segments in grooves provided in a mounting base fastened to the top of the gunwale, and the two segments held together by means of a wing nut screwed on a bolt extending through the two segments. As an alternate, this gunwale attachment apparatus may be mounted by straddling the boat gunwale and firmly attached to the boat side wall by means of adjustable wing nut screwed onto a bolt extending through the two segments to be rigidly attached to the boat gunwale and sidewall.

BRIEF DESCRIPTION OF DRAWINGS

FIG. 1 is isometric exploded view of boat gunwale attachment apparatus wherein:
1—inboard housing segment
2—outboard housing segment
3—through hole
4—male piller
5—ghost outline of adjustable bumper finger
6—assembly screw through hole
7—assembly screw
8—housing segment base notches
9—housing segment base notch
10—wing nut
11—anchor screws for gunwale attachment
12—upper gunwale attachment
13—lower gunwale attachment
19,19'—bumper finger of inner housing segment
20'—bumper finger of outboard housing segment
23—lantern holder attachment rings
25—under side of top section of inboard housing segment
26—under side of top section of inboard housing segment
27—cushion cap
FIG. 2 is elevation view of inboard housing segment wherein:
1—inboard housing segment
3—through hole
4—male piller
5—adjustable bumper finger on outboard housing segment
6—assembly screw through hole
17—base of inboard housing segment
19,19'—bumper fingers of inboard housing segment
25—under side of top section of inboard housing segment
FIG. 3 is an elevation view of mating face of outboard housing segment 2 wherein:
2—outboard housing segment
3—through hole
4'—male piller
5—adjustable bumper finger on outboard housing segment
7—assembly screw
20,20'—bumper fingers of outboard housing segment
22—screws for mounting accessories
26—under side of top section of outboard housing segment
27—cushion caps
FIG. 4 is a side elevation expanded view of mating housing segments sections A—A and B—B of FIGS. 2 and 3, respectively:
1—inboard housing segment
2—outboard housing segment
3—through hole
4—male piller
5—adjustable bumper finger on outboard segment housing
6—assembly screw hole
7—assembly screw
10—wing nut
11—gunwale base anchor screws
12—upper attachment on gunwale
13—lower attachment on gunwale
14—gunwale
15—inboard boat side wall
15'—outboard boat side wall
16—screw for adjustable bumper finger 5
17—base of inboard housing segment
18—base of outboard housing segment
19—bumper finger of inboard housing segment
20—bumper finger of outboard housing segment
21—gunwale mount attachment base slots
22—screws for mounting accessories
24—spacers between upper and lower attachments on gunwale
23—lantern holder attachment rings
25—under side of top section of inboard housing segment
26—under side of top section of outboard housing segment
27—cushion cap
FIG. 5 is an end elevation view of mount assembled on gunwale attachment wherein:
1—inboard housing segment 2—outboard housing segment
3—through hole
4—male piller
5—adjustable bumper finger
6—assembly screw through hole
7—assembly screw
10—wing nut
11—anchor screws for gunwale attachment
12—upper attachment on gunwale
13—lower attachment on gunwale
14—gunwale
15—inboard boat side wall
15'—outboard boat side wall
16—screw for adjustable bumper finger 5
17—base of inboard housing segment
18—base of outboard housing segment
19—bumper finger of inboard housing segment
20—bumper finger of outboard housing segment
21—gunwale mount attachment base slots
22—screws for mounting accessories
23—lantern holder attachment rings
25—under side of top section of inboard housing segment
26—under side of top section of outboard housing segment
27—cushion cap
FIG. 6 is a plan view of housing segment base wherein:
9—housing segment base notches
17—base of inboard housing segment
FIG. 7 is a plan view of housing segment base wherein:
8—housing segment base notches
18—base of outboard housing segment

DETAILED DESCRIPTION OF INVENTION

Figure 8:
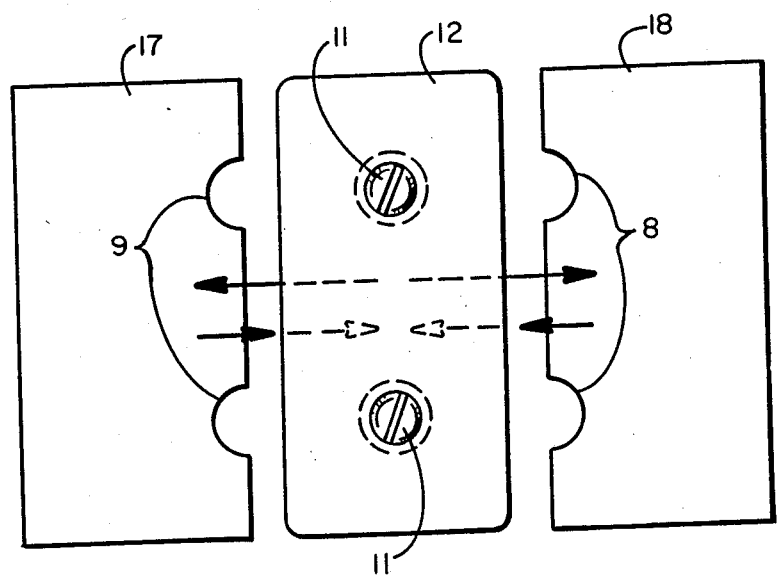
FIG. 8 is plan view of housing segment bases aligned to slide between gunwale attachments 12 and 13 wherein:
8—outboard housing segment base notches
9—inboard housing segment base notches
11—anchor screws for gunwale attachment
12—upper gunwale attachment
17—base of inboard housing segment
18—base of outboard housing segment
Figure 9:
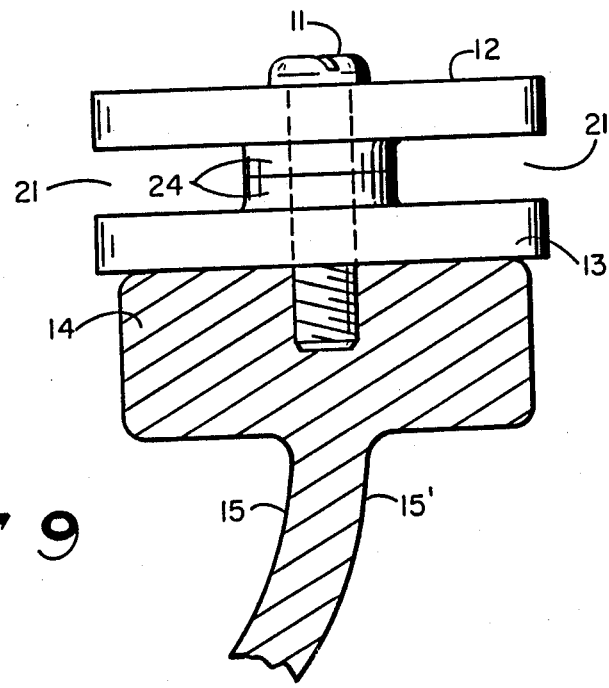
FIG. 9 is enlarged elevation view of gunwale attachment wherein:
11—anchor screws for gunwale attachment
12—upper gunwale attachment
13—lower gunwale attachment
14—gunwale
15—inboard boat side wall
15'—outboard boat side wall
21—gunwale mount attachment base slots
24—spacers

The boat gunwale attachment apparatus of this invention is comprised of two mating segments, an inboard housing segment 1, and outboard segment 2. Each mating segment has a through hole 3, which through holes 3 are located on the mating outboard and inboard segments opposite mating pillers 4, so that mating pillers 4 fit into through holes 3, just for enough to align the mating of the inboard and outboard housing segments.

To mount the two mating segments 1 and 2, assembly screw 7 is rigidly mounted horizontally in the outboard segment 2, and this assembly screw 7 extends through assembly screw through hole 6 in inboard housing segment 1, and wing nut 10 is screwed onto assembly screw 7, extending inboard through the above mentioned assembly screw through hole.

The two mating segments 1 and 2 as described above, are assembled on the gunwale 14, by inserting base of inboard housing segment 17, and base of outboard segment 18, in gunwale mount attachment base slots 21.

Gunwale mount attachment base slots 21, are provided by spacers 24 located between upper attachment on gunwale 12, and lower attachment on gunwale 13. The spacers 24 are rigidly fastened to gunwale 14 by means of screws 11 inserted through spacers 24.

As noted above, the base of inboard housing segment 17, and base of outboard segment 18 each fit in gunwale mount attachment base slots 21, and further notches are provided in bases 17 and 18 to fit around spacers 24. Housing segment base notches 8 of inboard housing segment 1 and segment base notches 9 of outboard housing segment 2, allow for fitting of the bases 17 and 18 in slots 21 and to snugly fit around spacers 24, so that bases 17 and 18 are in contact with each other in slots 21.

Figure 10:
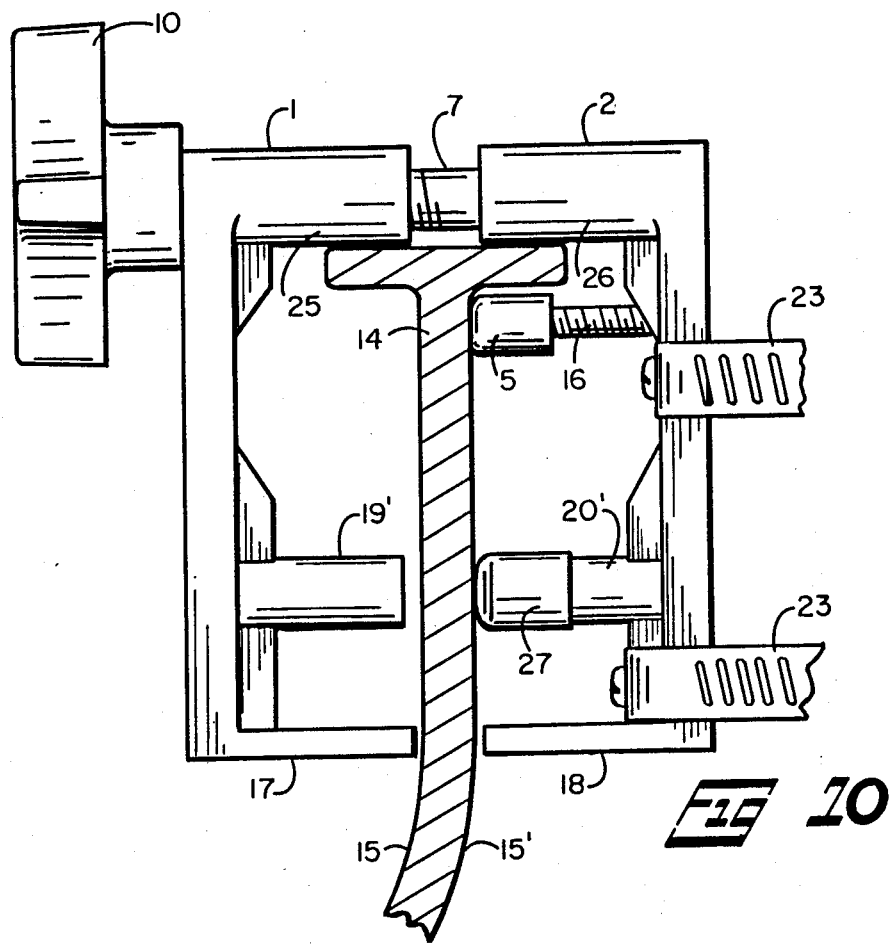
FIG. 10 is elevation view of housing mount straddling gunwale wherein:
1—inboard housing section
2—outboard housing section
5—adjustable bumper finger
7—assembly screw
10—wing nut
14—gunwale
15—inboard boat side wall
15—outboard boat side wall
16—screw for adjustable bumper finger
17—base of inboard housing segment
18—base of outboard housing segment
19'—bumper finger of inboard housing segment
20'—bumper finger of outboard housing segment
22—screws for mounting accessories
23—lantern holder attachment rings
25—under side of top section of inboard housing segment
26—under side of top section of outboard housing segment
27—cushion cap

The boat gunwale attachment apparatus of this invention, may be mounted on a gunwale attachment as described above, or as an alternate, this apparatus may be mounted by straddling the gunwale as shown in FIG. 10, and described as follows.

Inboard housing segment 1 and outboard housing segment 2, are assembled by means of assembly screw 7, which is rigidly mounted horizontally in the outboard segment 2, and this assembly screw 7 extends through assembly screw through hole 6 in inboard housing segment 1, and wing nut 10 is screwed onto assembly screw 7 extending inboard through the above mentioned assembly screw through hole 6. The assembled housing segments 1 and 2 are lowered so that the under sides 25 and 26 of top section of inboard housing segment 1, and outboard housing segment 2, respectively, rests on gunwale 14, and adjustable bumper finger 5 on outboard housing segment 2, set to contact the outboard side of the gunwale 14 or if the gunwale is of such a thin dimension that adjustable bumper finger 5 extends under the gunwale 14, this finger is then adjusted to be in contact with boat outboard side wall 15'. With this method of mounting the apparatus of the invention, bumper fingers of inboard housing segment 19 and 19' are in contact with boat inboard side wall 15, and bumper fingers of outboard housing segment 20 and 20' are in contact with boat outboard sidewall 15'.

Cushion caps 27 are mounted on bumper fingers 20 and 20' of outboard housing segments. These cushion caps may be of polyethylene, nylon, rubber or similar materials and merely slip on over above mentioned bumper fingers. Because of the thickness of the boat side wall, the outboard and inboard housing segments, do not mate, but instead there can be a space between these housing segments when wing nut 10 is tightened on assembly screw 7.

The boat gunwale attachment apparatus of this invention has great use and utility in that this may be used as a fishing rod holder attachment or as shown here, a holder for a lantern, which can be mounted in adjustable ring attachments 23, which ring attachments 23 are fastened by screws 22 for mounting the above mentioned ring attachments.

Figure 11:
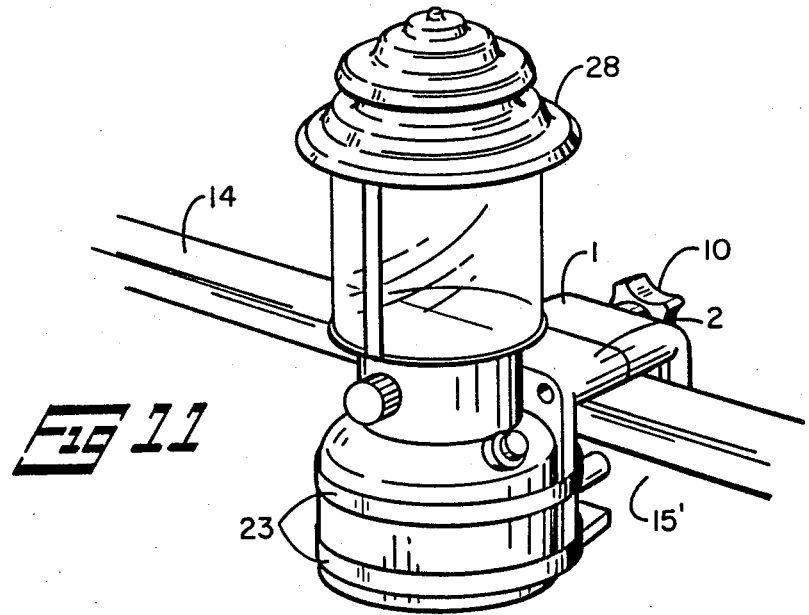
FIG. 11 shows a lantern mounted on the boat gunwale attachment apparatus of this invention wherein:
1—inboard housing segment
2—outboard housing segment
10—wing nut
14—gunwale
15'—outboard boat side wall
23—lantern holder attachment rings
28—lantern

FIG. 11 shows a lantern mounted on the boat gunwale attachment apparatus of this invention, wherein lantern 28 is held in ring attachments 23.

It is to be pointed out that ring attachments 23 are adjustable to any desired diameter for holding the above mentioned lantern 28.

Other gear desired may be held by ring attachments 23.

Having thus described my invention, I claim:

1. Boat gunwale attachment apparatus wherein the improvement comprises:
   a—an outboard housing segment,
   b—an inboard housing segment and
   c—an assembly screw rigidly attached to said outboard housing segment, and
   d—said assembly screw rigidly attached horizontally from said outboard housing segment, and
   e—said assembly screw extending horizontally inward
   f—through assembly screw through hole, of said inboard housing segment, and
   g—bases of inboard and outboard housing segments fitting in slots between
   h—upper attachment on gunwale and lower attachment on gunwale, and
   i—said upper attachment on gunwale and said lower attachment on gunwale separated by spacers to provide said slots and
   j—notches in said bases of inboard and outboard housing segments and, and
   k—wing nut screwed on said assembly screw extending horizontally through assembly screw hole in inboard housing segment to bring the outboard and inboard housing segments into contact of their mating segments.

2. Boat gunwale attachment apparatus of claim 1, wherein the improvement comprises:
   a—notches in bases of inboard and outboard housing segments to surround spacers between
   b—upper attachment on gunwale and lower attachment on gunwale
   c—to allow the mating sections of the outboard and inboard housing segments to contact each other.

3. Boat gunwale attachment apparatus of claim 1, wherein the improvement comprises adjustable holder attachment rings mounted on outboard side of outboard housing segment of said boat gunwale attachment apparatus.

4. Boat gunwale attachment apparatus of claim 3 wherein the improvement comprises a lantern mounted in adjustable holder attachment rings mounted on outboard side of outboard housing segment of said boat gunwale attachment apparatus.

5. Boat gunwale attachment apparatus wherein the improvement comprises:
   a—outboard housing segment
   b—inboard housing segment
   c—assembly screw rigidly attached to said outboard housing segment, and
   d—said assembly screw rigidly attached horizontally from said outboard housing segment, and
   e—said assembly screw extending horizontally inward
   f—through assembly screw through hole of said inboard housing segment, and
   g—outboard and inboard housing segments straddle boat gunwale, and
   h—undersides of top sections of said housing segments rest on said boat gunwale and
   i—wing nut is screwed onto said assembly screw, and
   j—adjustable bumper finger on outboard housing segment to contact outboard side of gunwale or side of boat.

6. Boat gunwale attachment apparatus of claim 5 wherein the improvement comprises adjustable holder attachment rings mounted on outboard side of outboard housing segment of said boat gunwale attachment apparatus.

7. Boat gunwale attachment apparatus of claim 5, wherein the improvement comprises a lantern mounted in adjustable holder attachment rings mounted on outboard side of outboard housing segment of said boat gunwale attachment apparatus.

* * * * *